United States Patent [19]
Boschetto

[11] Patent Number: 5,152,602
[45] Date of Patent: Oct. 6, 1992

[54] ELECTRIC CANDLE

[76] Inventor: Andrew Boschetto, 11 Jamie Dr., Sewell, N.J. 08080

[21] Appl. No.: 828,151

[22] Filed: Jan. 30, 1992

[51] Int. Cl.$^5$ .............................................. F21V 23/04
[52] U.S. Cl. ................................... 362/276; 362/392; 362/802; 362/810
[58] Field of Search ............... 362/276, 295, 351, 392, 362/810, 802

[56] References Cited

U.S. PATENT DOCUMENTS

| | | | |
|---|---|---|---|
| 4,187,532 | 2/1980 | Naffier | 362/392 |
| 4,617,614 | 10/1986 | Lederer | 362/810 |
| 4,731,718 | 3/1988 | Sheu | 362/810 |
| 4,839,784 | 6/1989 | Lin | 362/810 |
| 4,866,580 | 9/1989 | Blackerby | 362/810 |

Primary Examiner—Richard R. Cole
Attorney, Agent, or Firm—Longacre & White

[57] ABSTRACT

The present invention is directed to an electric candle having an ornamental base and a faux candlestick, the latter being made from a translucent material. The invention also has an electrical circuit for sensing ambient light conditions and automatically turning on and off the electric candle. The sensor for the electrical circuit is located within the translucent candlestick.

5 Claims, 2 Drawing Sheets

ELECTRIC CANDLE

BACKGROUND OF THE INVENTION a) Field of the Invention

The present invention pertains to a light fixture having a sensor to automatically turn the fixture on and off.

b) Description of Related Art

It is known to incorporate a sensor for turning on and off a light fixture. Examples of known sensors include those which are responsive to ambient light or touch. The majority of small electrical devices in general, and light fixtures in particular, use a two-wire, non-grounded connection to a power source. This places a premium on proper insulation and solid construction to minimize the potential for electrical shock.

In the case of ornamental light fixtures, their shape is often configured to resemble a comparable non-electrified device such as a candle or an oil lantern. Further, their external appearance is a primary concern since the light fixtures are intended to be displayed. In these cases, the availability of an unobtrusive cavity within the fixture to house the sensor is very restricted.

Known sensors have been arranged in configurations which attempt to minimize the volume of the circuitry package, however, in many instances it is more important to provide a circuitry package which has a small aspect ratio to facilitate assembly within tubular cavities and provide a more streamlined appearance better suited to positioning along the length of a wire. Additionally, a sensor package having a small aspect ratio is easily encased by a tubular insulating sleeve.

SUMMARY OF THE INVENTION

It is an object of the present invention to provide an ornamental light fixture having a sensor device which is responsive to ambient light.

It is another object of the invention to provide an ornamental light fixture having a sensor device which is simply and easily insulated to minimize the potential of electrical shock.

It is yet another object of the invention to provide a sensor configured for expeditious assembly and unobtrusive mounting within an ornamental light fixture.

DESCRIPTION OF THE PREFERRED EMBODIMENTS

Figure 1:
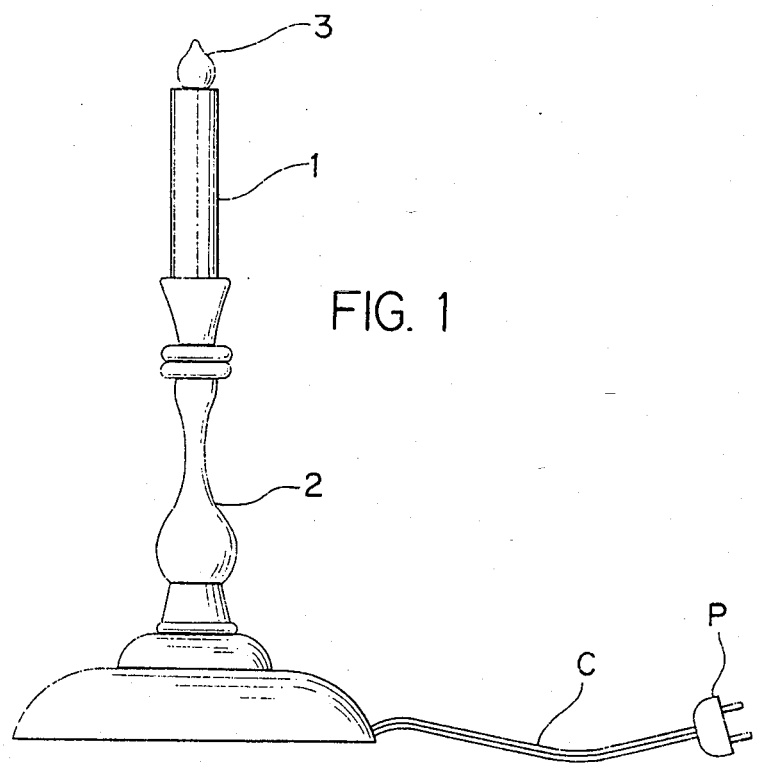
FIG. 1 is a front elevation view of the present invention.

FIG. 1 reveals the electric candle according to the present invention. The electric candle comprises a candlestick portion 1, an ornamental base portion 2, and a light bulb 3. An electrical cord C extends from the base portion 2 and carries a plug P for connecting the electric candle to a standard a.c. electrical outlet.

Figure 2:
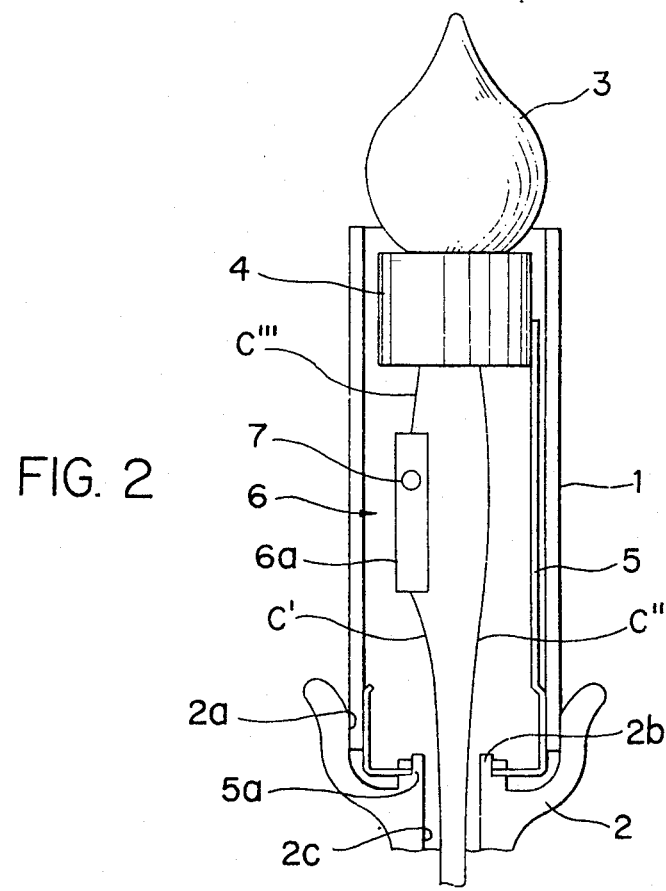
FIG. 2 is a front sectional view of a portion of the present invention.

As seen in FIG. 2, the candlestick portion 1 (which is made from a translucent thermoplastic material) is received within an opening 2a provided in an upper part of the base portion 2. The candlestick portion 1 surrounds, and may frictionally engage, a light bulb socket 4. The light bulb socket 4 is secured to (e.g. by rivetting) and supported by a vertical support member 5 extending from the base portion 2. Specifically, the base portion 2 is provided with an annular projection 2b near the bottom of the opening 2a, and the support member 5 is provided, at its end opposite the light bulb socket, with an annular portion 5a which surrounds the annular projection 2b and which is fixed thereto appropriately (e.g. friction, adhesive, screw threads, etc.). The candlestick portion 1 is frictionally clamped in a narrow gap between the base portion 2 and the support member 5.

The electric lamp further comprises electrical connection means, in the form of electrical wiring or leads C', C'' and a jumper wire C''', for applying an electric current to the light bulb 3. Specifically, a bore 2c (or similar arrangement) is provided in the base 2 for permitting the electrical leads C', C'' to pass through the base. The bore 2c passes through the annular projection 2b and opens into the opening 2a. In the preferred embodiment, the leads C', C'' comprise the same conductors which make up the electrical cord C.

Interposed between the live lead C' and the jumper C''' is an electrical circuit 6. The electrical circuit 6 is fabricated on a narrow, elongated circuit board (shown in more detail in FIG. 3, described hereinafter). The circuit board is mechanically clamped and soldered to the live lead C' and to the jumper C''', whereby electrical continuity is established from the live lead C', through the circuit 6, and to the jumper C'''. The circuit board is covered by an insulating rubber tube 6a. The rubber tube 6a surrounds and insulates all of the electrical components and connections on the circuit board 6a except a photoelectric switch 7. The photoelectric switch 7 protrudes through an opening formed in the rubber tube and is consequently exposed to the ambient light inside the translucent candlestick portion 1.

Figure 3:
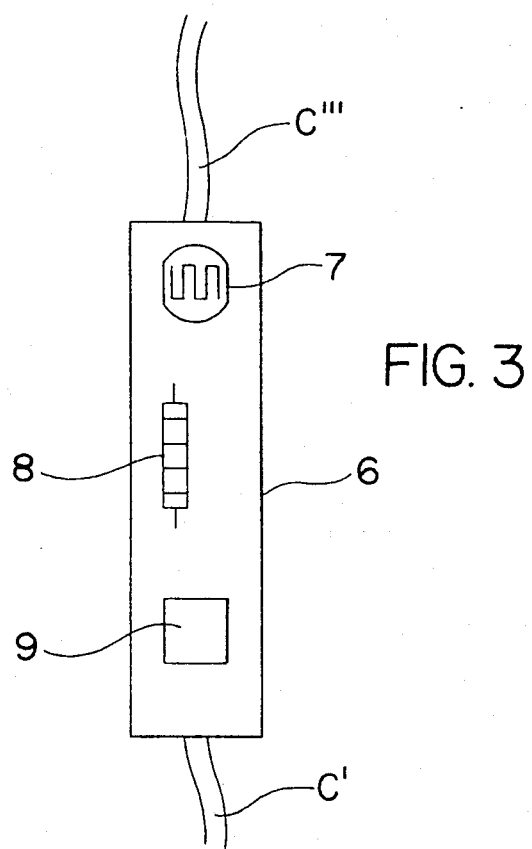
FIG. 3 is a plan view of the mounted electrical circuit components of the present invention.

FIG. 3 reveals the sequential arrangement of electrical components along the elongated length of the circuit board 6. Because of the components arrangement, the sensor package has a small aspect ratio which facilitates sliding the sensor package into tubular cavities. The circuit comprises the photoelectric switch 7, a resistor 8, and a silicon controlled rectifier 9. These components together form the circuit arrangement shown in FIG. 4.

Figure 4:
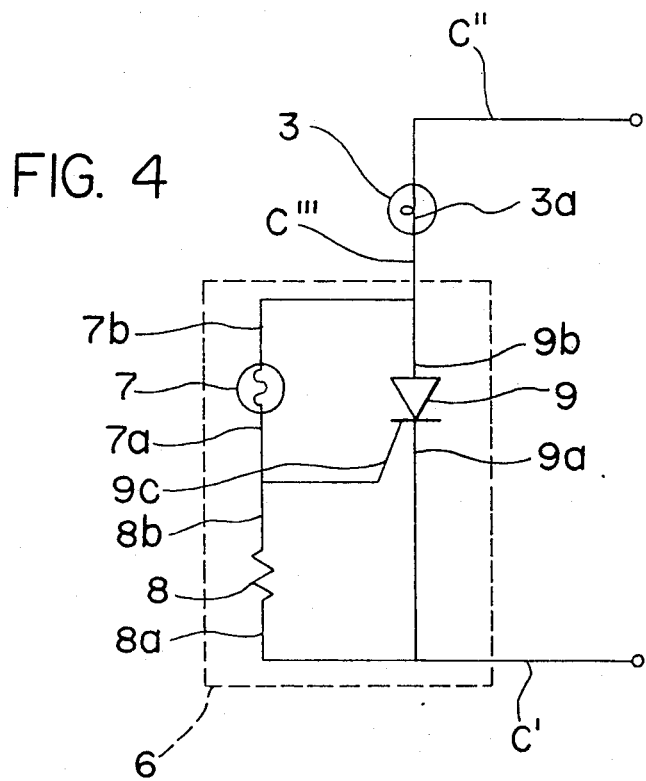
FIG. 4 is a schematic of the electrical circuit of the present invention.

As shown in FIG. 4, live lead C' is connected to the cathode 9a of the silicon controlled rectifier and a first lead 8a of the resistor 8. A second lead 8b of the resistor 8 is connected to a first lead 7a of the photoelectric switch 7 and the gate 9c of the silicon controlled rectifier 9. A second lead 7b of the photoelectric switch 7 is connected to the anode 9b of the silicon controlled rectifier 9 and the jumper C'''. The light bulb 3 has a filament 3a which is interposed between and electrically connected to the jumper C''' and the lead C''.

The operation of the electric candle will now be described. The resistance across the photoelectric switch 7 is inversely proportional to the ambient light level inside the translucent candlestick portion 1, i.e. resistance is greatest when the light level is lowest and vice-versa. In high level ambient light, the resistance of the photoelectric switch 7 is quite low relative to the fixed resistance of the resistor 8. Therefore, the voltage drop across the resistor 8 consumes substantially the entirety of the source voltage and consequently, the signal voltage available at the gate 9c of the silicon controlled rectifier 9 is insufficient to breakover the silicon controlled rectifier 9 to pass current from the cathode to the anode. In low level ambient light, the resistance of the photoelectric switch 7 is increased to an appreciable level. The voltage drop across the photoelectric switch 7, and hence the signal voltage available at the gate 9c of the silicon controlled rectifier 9, is now sufficient to breakover the silicon controlled rectifier 9 and pass current from the anode 9a to the cathode 9b of the silicon controlled rectifier 9, illuminating the light bulb 3.

By way of example, given a standard 120 V a.c. power source, a 120V 7.5W light bulb, a 4.7MΩ ¼W resistor, and a photoelectric switch having a range of resistance from 3kΩ (high level ambient light) to 0.2MΩ (low level ambient light), the gate signal voltage will range from 0.8V to 6V. The light level which activates the photoelectric switch may be chosen based upon the average ambient light level available in a given locality at dusk.

A number of variations on the present invention are contemplated including locating the electric circuit for activating the electric candle along the length of the electric cord between the plug and the base portion. The arrangement and selection of components for the circuit may be varied. For instance, the connection of the live lead C' and the jumper C''' to the circuit may be transposed, or the second lead of the photoelectric switch may be reconnected to the light bulb and lead C'' rather than to the anode and the jumper.

The present invention should not be construed as limited by the exemplary embodiments described or shown. Rather, the scope of the invention is defined only by the following claims.

What is claimed:

1. An electric candle comprising:
   an ornamental base portion:
      a candlestick portion extending from within said base portion, wherein said candlestick portion is made of a translucent material;
      a support member extending within said candlestick portion from said base portion toward said light bulb socket, said candlestick portion frictionally clamped in a narrow gap between said base portion and said support member;
      a light bulb mounted in a light bulb socket disposed at an end of said candlestick portion distal from said base portion, wherein said light bulb comprises a filament;
      electrical circuit means for carrying an electrical current to said filament of said light bulb;
      current switching means for selectively interrupting said electrical current to said filament of said light bulb;
   wherein said current switching means is disposed within said translucent candlestick portion and comprises:
      sensor means for sensing an amount of ambient light within said translucent candlestick portion; and
      control means for controlling said current switching means to interrupt said electrical current to said filament when the amount of the ambient light within said translucent candlestick portion exceeds a predetermined intensity, whereby said electric candle is illuminated when there is a low level of the ambient light within said translucent candlestick portion and said electric candle is automatically extinguished when there is a high level of the ambient light within said translucent candlestick portion, and wherein said current switching means is encapsulated within san insulating tube and said sensor means projects through a side of said insulating tube.

2. The electric candle of claim 1, said control means comprises a silicon controlled rectifier adapted to control a flow of electricity to said filament.

3. The electric candle of claim 2, said sensor means comprises a photoelectric switch having an electrical resistance adapted to actuate said silicon controlled rectifier, wherein the electrical resistance of said photoelectric switch is inversely proportional to the ambient light level.

4. The electric candle of claim 1, said electrical circuit means comprises conductive leads extending from said current switching means through said insulating tube.

5. The electric candle of claim 1, said current switching means has a small aspect ratio of cross-section to length whereby said current switching means is adapted for positioning within a tubular member of said electric candle.

* * * * *